(12) United States Patent
Braconnier et al.

(10) Patent No.: US 7,208,130 B2
(45) Date of Patent: Apr. 24, 2007

(54) PROCESS FOR PREPARING RARE EARTH BORATES, AND USE OF THE BORATES OBTAINED IN LUMINESCENCE

(75) Inventors: Jean-Jacques Braconnier, Lagord (FR); Muriel Goubard, Paris (FR)

(73) Assignee: Rhodia Electronics and Catalysis, La Rochelle (FR)

( * ) Notice: Subject to any disclaimer, the term of this patent is extended or adjusted under 35 U.S.C. 154(b) by 661 days.

(21) Appl. No.: 10/169,023

(22) PCT Filed: Dec. 14, 2000

(86) PCT No.: PCT/FR00/03525

§ 371 (c)(1),
(2), (4) Date: Mar. 21, 2003

(87) PCT Pub. No.: WO01/49605

PCT Pub. Date: Jul. 12, 2001

(65) Prior Publication Data

US 2003/0161776 A1    Aug. 28, 2003

(30) Foreign Application Priority Data

Dec. 29, 1999 (FR) .................................. 99 16644

(51) Int. Cl.
*C01F 17/00* (2006.01)
*C01B 35/00* (2006.01)

(52) U.S. Cl. ...................................... 423/263; 423/279
(58) Field of Classification Search ................ 423/21.1, 423/263, 279; 252/301.4 R; 313/486
See application file for complete search history.

(56) References Cited

U.S. PATENT DOCUMENTS 6,197,218 B1 *   3/2001   Hampden-Smith et al. ...... 252/301.4 R
6,238,593 B1 *   5/2001   Huguenin et al. .... 252/301.4 R

FOREIGN PATENT DOCUMENTS

FR    2 743 555    7/1997
FR    2 752 833    3/1998

* cited by examiner

*Primary Examiner*—Steven Bos
(74) *Attorney, Agent, or Firm*—Buchanan, Ingersoll & Rooney PC

(57) ABSTRACT

The invention concerns a process for preparing rare earth borates, and the use of these borates in luminescence.

The preparation process is characterized in that it comprises the following steps
mixing boric acid and a rare earth salt;
a reacting the mixture obtained with a carbonate or a bicarbonate;
a calcining the precipitate obtained.

10 Claims, No Drawings

PROCESS FOR PREPARING RARE EARTH BORATES, AND USE OF THE BORATES OBTAINED IN LUMINESCENCE

The present invention relates to a process for preparing rare earth borates and to the use of these borates in luminescence.

The fields of luminescence and electronics are currently making huge developmental advances. Examples that can be cited are the development of plasma systems (screens and lamps) for new viewing and lighting devices. One specific example is the replacement of standard television screens by flat screens. These new applications demand luminophoric materials with ever more demanding properties. Rare earth borates constitute such materials.

A process for preparing such borates is known wherein a previously prepared rare earth carbonate or hydroxycarbonate is reacted with boric acid. Such a process has been described in published International patent application WO-A-97/26312. This process can produce products with a specific morphology. However, a further improved process is needed, in particular to further reduce reaction times.

In addition, it is important for the phase purity of the borates to be high for use in the applications described above.

Thus, the invention aims to provide an improved process that can lead to phase pure rare earth and cerium borates.

To this end, the invention provides a process for preparing a rare earth borate, characterized in that it comprises the following steps:
mixing boric acid and a rare earth salt;
reacting the mixture obtained with a carbonate or a bicarbonate;
a calcining the precipitate obtained.

The invention also provides a process for preparing a rare earth hydroxyborocarbonate, a precursor for a rare earth borate, characterized in that it comprises the following steps:
mixing boric acid and a rare earth salt;
reacting the mixture obtained with a carbonate or a bicarbonate;
recovering the precipitate obtained.

Further characteristics, details and advantages of the invention will become apparent from the following description and non-limiting examples that illustrate the invention.

The process of the invention concerns the preparation of rare earth borates or hydroxyborocarbonates. The term "rare earth" as used throughout the present description means elements from the group constituted by yttrium, scandium and elements from the periodic table with atomic numbers of 57 to 71 inclusive.

The term "rare earth borate" means products with formula $LnBO_3$ (orthoborate), where Ln designates the rare earth as defined above. The term "rare earth hydroxyborocarbonate" means products with formula $LnB(OH)_z(CO_3)_y$, this hydroxyborocarbonate possibly being hydrated to a greater or lesser extent. It should be understood that the process of the present invention is also applicable to preparing mixed rare earth borates or hydroxyborocarbonates, with the formulae given above and in which Ln is constituted by a mixture of two or more rare earths. More particularly, the process of the present invention can be used to prepare a borate or hydroxyborocarbonate of yttrium, lanthanum, lutetium, scandium or gadolinium. More particularly still, the preparation of an ytterbium or cerium borate can be mentioned.

The process is also applicable to preparing doped or substituted rare earth borates with formula $Ln_{1-x}M_xBO_3$ where M represents a doping element or substituent. The aim of this doping element or substituent is to endow the borate with luminescent properties or to reinforce them, and it can be selected from the group formed by aluminium, silicon, antimony, bismuth, and rare earths in particular including cerium, terbium, lanthanum, gadolinium, europium, thulium, erbium and praseodymium. The value of x can be up to 0.5. Since rare earths occur in this group, clearly the rare earth used as the dopant or substituent will be different from the rare earth constituting the borate. Clearly, the process of the invention is also applicable to preparing hydroxyborocarbonate precursors of the doped or substituted borates cited above.

The process of the of the invention comprises a first step in which a rare earth salt is mixed with boric acid. The rare earth salt can be an inorganic or organic salt. Preferably, water-soluble salts are used. More particularly, the rare earth salt can be the nitrate. Clearly, when preparing mixed borates or hydroxyborocarbonates, a salt of each of the rare earths concerned is used.

When preparing a doped or substituted borate or its hydroxyborocarbonate precursor, a mixture of a rare earth salt and boric acid can be formed that also comprises a salt of the doping or substituting element; that stated above with respect to the rare earth salts is also applicable in this case.

The boric acid can be used in the form of a solution or, as is preferable, in the solid form.

In a variation of the invention, the mixture can be made with a rapid mixer. This means any system that can allow rapid introduction of the reactants into the reactor, in particular a piston system, and rapid and homogeneous contact between those reactants. A tube with a Y-shaped geometry can be used as a mixer of this type.

Mixing can be carried out at ambient temperature, or it can be heated.

The mixture obtained is acidic and can be neutralised to a pH of 4 or about 4, for example by adding an ammonia solution.

The second step of the process of the invention consists of reacting the mixture obtained in the preceding step with a carbonate or a bicarbonate (the carbonate or bicarbonate must be water-soluble).

Alkaline carbonates can be mentioned as the carbonate or bicarbonate. More particularly, ammonium carbonate or bicarbonate can be used.

In a variation of the invention, the reaction is carried out in the presence of a base. Suitable bases that can be cited are alkali or alkaline-earth hydroxides, ammonia and secondary, tertiary or quaternary amines. Preferably, ammonia is used.

It should be noted that in the case of preparing a borate or its precursor, comprising a dopant or a substituent, the salt of the dopant or substituent can be introduced during the reaction if this has not been carried out during the preceding step.

In a preferred implementation of the invention, the reaction is carried out with adjustment of the pH. This means that the pH of the reaction medium is adjusted to a fixed value. Adjustment can be made by acting on the quantity of base used for the reaction. This fixed value is preferably in the range 4 to 6.

The reaction can be carried out at ambient temperature or with heating.

A maturation step can then be carried out. This step consists of keeping the reaction medium at a given temperature, preferably with heating, at a constant pH and at the value described above, preferably under a controlled atmosphere. The maturation period is generally at least 15 minutes and at most 8 hours.

Following the reaction, a precipitate is obtained that is separated from the reaction medium using any known means, for example filtration, and which is optionally washed then dried.

A product based on a rare earth hydroxyborocarbonate is obtained which may also comprise the dopant or substituent element.

Calcining is carried out to obtain the borate.

This calcining is generally carried out at a temperature in the range 500° C. to 1400° C., more particularly in the range 500° C. to 1100° C. It is possible to carry out this calcining in air, in a reducing atmosphere (for example hydrogen), in a neutral atmosphere (argon), or in mixtures thereof.

In a further variation of the invention, the dopant or substituent elements cited above can be introduced at this step in the process (calcining). The hydroxyborocarbonate obtained is mixed with the elements cited above in the solid form, for example in the form of the oxide, carbonate or hydroxycarbonate, in particular in the form of $SiO_2$, $Al_2O_3$, $Al(OH)CO_3$.

The borate obtained can be in the form of spherical, cubic or parallelepipedal particles.

Further, the size of these particles can vary widely. In a preferred implementation of the invention, the mean size of the particles is at most 10 µm, more particularly at most 5 µm and still more particularly in the range 0.5 to 5 µm. The sizes mentioned here are determined by laser diffraction using a COULTER type (LS 230) granulometer.

The particles have a homogeneous morphology, i.e., the majority, preferably all, have the same morphology.

The process of the invention has a number of advantages. The reaction time is reduced. Further, a more concentrated medium can be used with optimised quantities of reactants. In particular, a reduced quantity of carbonate can be used which stops foam from forming during the reaction.

The process of the invention can in particular be used to prepare a rare earth borate doped with cerium. The amount of cerium in this borate can be at most 8% (x as defined above is at most 0.08); more particularly it can be in the range 1% to 5%.

This borate is in the form of a pure phase. This means that X ray analysis of the product calcined at 1100° C. shows only one phase that corresponds to the lattice of the rare earth borate $LnBO_3$. There is no $CeO_2$ type phase. This phase purity means that the cerium is stabilised in the $3^+$ state in the borate.

In a particular implementation, the borate comprises a constitutive rare earth, i.e., the rare earth that forms the matrix of the product with the boron and other than the dopant or substituent, which is yttrium or gadolinium or a combination of the two; in the latter case the borate is a mixed yttrium and gadolinium borate.

The borates obtained in the process described above can be used as luminophores. In particular, they can be used for low voltage luminescence, in particular in the production of any device using such low voltage luminescence, such as field effect screens. Further, they have luminescent properties under electromagnetic excitation in the wavelength range used in plasma systems and in mercury vapour lamps. Thus, they can be used as luminophores in plasma systems (viewscreen or lighting system) or in trichromatic lamps.

Finally, the invention also concerns luminescent devices of the field effect type screen, for example, incorporating the borates described above or as obtained by the process of the invention. In these devices, the luminophores are disposed on screens subjected to low energy excitation. Similarly, the invention concerns plasma systems where the borates are used in the manufacture thereof. The luminophores are used in producing low voltage luminescent devices or plasma systems according to well known techniques, for example serigraphy, electrophoresis or sedimentation.

Examples will now be given.

EXAMPLE 1

A solution was constituted by a mixture of yttrium, gadolinium and europium nitrates with the following composition (atomic %):
Y: 72%
Gd: 23%
Eu: 5%

Crystalline boric acid and the rare earth (RE) nitrate solution was mixed in a reactor containing demineralised water in proportions such that the B/RE mole ratio was 1.5. The mixture formed was neutralised to a pH of 4.4 using 6N ammonia then the concentration of the mixture was adjusted to 0.6 mole/litre of RE elements by adding water.

A precipitating solution of ammonium bicarbonate in a concentration of 1.34 mole/litre of $NH_4HCO_3$ and 0.7 mole/litre of ammonia was slowly added over 54 minutes to 2.8 litres of the above solution, heated to 60° C. and stirred. During addition, the pH was maintained at a value of at least 4.6 by adding 6N ammonia. Adding the precipitating solution was halted as soon as the pH of the mixture reached a value of 5; the concentration of rare earth in the mixture obtained was 0.39 mole/litre.

Throughout the reaction, the temperature of the reaction medium was kept constant at 60° C.

This mixture was then heated and stirred for 40 minutes.

The precipitate was then filtered through a Büchner funnel and washed with 2 litres of a cold 2 g/litre (0.03 mole/litre) boric acid solution.

The solid obtained was dried overnight at 60° C. then calcined at 900° C. for 1 hour 15 minutes.

After breaking up slightly, X ray diffraction analysis showed that the powder obtained corresponded to a pure rare earth orthoborate $LnBO_3$ (Ln=Y, Gd, Eu) with spherical particles, as shown by scanning electron microscopy.

COMPARATIVE EXAMPLE 2

The same solution of rare earths as used in Example 1 was employed, which was also neutralised as in that example and brought to a concentration of 0.7 mole/litre of RE elements.

A precipitating solution containing ammonium bicarbonate in a concentration of 1.3 mole/litre of $NH_4HCO_3$ and 0.74 mole/litre of ammonia was added over 1 hour to a reactor heated to 60° C. and stirred, containing 1.5 litres of the above solution.

The quantity of bicarbonate solution added was such that the $HCO_3^-$/RE mole ratio was 1.6.

Then, with the suspension heated and stirred, a solution of 0.8 mole $H_3BO_3$/litre of boric acid was added over 30 minutes so that the B/RE mole ratio was 1.5.

This mixture was then heated and stirred for 2 hours 50 minutes, adjusting its pH to 4.6 by adding 6N ammonia. The concentration of the suspension obtained was 0.22 moles of $LnBO_3$/litre.

The precipitate was then filtered through a Büchner funnel and washed with 2 litres of cold water.

The solid obtained was dried overnight at 60° C. then calcined at 900° C. for 1 hour.

After breaking up slightly, X ray diffraction analysis showed that the powder obtained corresponded to a pure rare earth orthoborate $LnBO_3$ with cubic particles, as shown by scanning electron microscopy.

It should be noted that the process period, calculated from preparation of the solution of rare earth carbonates from the nitrate solution to filtering the precipitate, was much longer in the case of Example 2 (4 h 20) than in the case of Example 1 (1 h 34).

The invention claimed is:

1. A process for preparing a rare earth borate, comprising the following steps:
   mixing boric acid and a rare earth salt;
   reacting the mixture obtained with a carbonate or a bicarbonate thereby producing a precipitate; and
   calcining the precipitate obtained;
   thereby forming a rare earth borate.

2. A process according to claim 1, comprising reacting said mixture with a carbonate or bicarbonate in the presence of a base.

3. A process according to claim 1, wherein the mixture is reacted with an ammonium carbonate or bicarbonate.

4. A process according to claim 1, further comprising reacting the mixture in the presence of ammonia.

5. A process according to claim 1, wherein solid boric acid is mixed with the rare earth salt.

6. A process according to claim 1, wherein the pH for the reacting of said mixture with a carbonate or bicarbonate is adjusted to a fixed value by changing the quantity of base used for the reaction.

7. A process according to claim 1, wherein the rare earth salt comprises at least one rare earth wherein the rare earth is yttrium, gadolinium, lanthanum, lutetium, ytterbium, cerium or scandium.

8. A process according to claim 1, further comprising at least one dopant or substituent element, wherein a mixture of a rare earth salt and boric acid is formed which also comprises a salt of the dopant or substituent element, or the reaction is carried out in the presence of a salt of said dopant or substituent element.

9. A process according to claim 8, wherein the dopant or substituent element is selected from the group consisting of: aluminium, silicon, antimony, bismuth, cerium, terbium, lanthanum, gadolinium, europium, thulium, erbium and praseodymium.

10. A process according to claim 1, wherein the boric acid and rare earth salt are mixed with a rapid mixer.

* * * * *